(12) United States Patent
Robbins et al.

(10) Patent No.: US 12,306,884 B2
(45) Date of Patent: May 20, 2025

(54) INFORMED LABELING OF RECORDS FOR FASTER DISCOVERY OF BUSINESS CRITICAL INFORMATION

(71) Applicant: EMC IP Holding Company LLC, Hopkinton, MA (US)

(72) Inventors: Alex Robbins, Cambridge, MA (US); Akshaya Khare, Medford, MA (US); Nicole Reineke, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 101 days.

(21) Appl. No.: 17/362,702

(22) Filed: Jun. 29, 2021

(65) Prior Publication Data
US 2022/0414165 A1  Dec. 29, 2022

(51) Int. Cl.
*G06F 16/951* (2019.01)
*G06F 16/908* (2019.01)
*G06Q 30/0201* (2023.01)

(52) U.S. Cl.
CPC .......... *G06F 16/951* (2019.01); *G06F 16/908* (2019.01); *G06Q 30/0201* (2013.01)

(58) Field of Classification Search
CPC .. G06F 16/951; G06F 16/908; G06Q 30/0201
USPC ........................................................ 707/710
See application file for complete search history.

(56) References Cited

U.S. PATENT DOCUMENTS

| | | | | |
|---|---|---|---|---|
| 8,626,794 B2* | 1/2014 | Liao | ........................ | H04L 63/08 707/791 |
| 8,954,416 B2* | 2/2015 | Tuttle | ..................... | G06F 16/951 707/711 |
| 9,015,301 B2* | 4/2015 | Redlich | ............... | G06F 21/6254 707/777 |
| 9,251,364 B2* | 2/2016 | Ture | ...................... | G06F 16/951 |
| 10,380,144 B2* | 8/2019 | Vermeulen | ............ | G06F 16/245 |
| 11,163,840 B2* | 11/2021 | Brousseau | ............ | G06F 40/216 |
| 2008/0027933 A1* | 1/2008 | Hussam | ................. | G06F 16/904 715/272 |
| 2010/0050098 A1* | 2/2010 | Turner | ................. | G06F 16/4387 715/763 |
| 2010/0070448 A1* | 3/2010 | Omoigui | ............ | H01L 27/1463 706/55 |
| 2012/0215592 A1* | 8/2012 | Amaru | ..................... | G06F 16/25 705/7.37 |

(Continued)

OTHER PUBLICATIONS

Kag, Aakash, et al., "Multiclass Single Label Mode for Web Page Classification", ICRAECC 2019, Nagercoil, India, Mar. 7-8, 2019, 6 pages.*

(Continued)

*Primary Examiner* — Robert Stevens
(74) *Attorney, Agent, or Firm* — Workman Nydegger

(57) ABSTRACT

One example method includes crawling data included in a dataset, based on the crawling of the data, creating and/or obtaining metadata concerning the data, crawling the metadata and obtaining information about a data change event involving the data, based on the crawling of the metadata, creating a meta label that documents occurrence of the data change event, and associating the meta label with the metadata. An analysis of the data, metadata, and meta label, may be performed and a trigger generated based on the analysis.

18 Claims, 3 Drawing Sheets

(56) References Cited

U.S. PATENT DOCUMENTS

| | | | | |
|---|---|---|---|---|
| 2012/0272304 A1* | 10/2012 | Liao | ............... | H04L 63/102 |
| | | | | 726/6 |
| 2014/0280179 A1* | 9/2014 | Coleman | ............ | G06F 16/3323 |
| | | | | 707/740 |
| 2018/0276304 A1* | 9/2018 | Peled | ............... | G06F 16/958 |
| 2021/0058418 A1* | 2/2021 | Murphey | ............. | H04L 63/145 |
| 2022/0292525 A1* | 9/2022 | Ash | ............... | G06N 3/08 |

OTHER PUBLICATIONS

Farag, Mohamed M. G., et al., "Focused crawler for events", International Journal on Digital Libraries, vol. 19, Springer Nature Link, Mar. 2018, pp. 3-19.*

* cited by examiner

INFORMED LABELING OF RECORDS FOR FASTER DISCOVERY OF BUSINESS CRITICAL INFORMATION

FIELD OF THE INVENTION

Embodiments of the present invention generally relate to detection of anomalies in a dataset. More particularly, at least some embodiments of the invention relate to systems, hardware, software, computer-readable media, and methods for crawling data to create metadata, and then analyzing the metadata to identify anomalies.

BACKGROUND

Data is a huge part of our world today, and companies have a lot to gain by being able to gather insights about their data. These insights can come not just from the content of the data, but also from the activity that takes place in and around the files where the data is stored.

The users who deal with these massive amounts of data face many challenges when trying to gain an understanding deep enough to gather useful insights. For example, even if there is initially a good understanding of the data, it is highly likely the data will change, and that understanding will be lost. Keeping up with these changes is incredibly difficult with large datasets, especially when done manually.

Additionally, without the information about what events are taking place with regard to the data, a full understanding can never be achieved. It is not enough to just know what is stored in the content of a file, one also needs to know how that file and those around it are changing. This can only be achieved with an audit trail representing the full history of the files and their change events.

As well, if the engineers, data scientists or administrators who may be interested in this information are never made aware of its existence, there is no way for them to act upon it. Invested parties need to be alerted of these events of interest as soon as they are detected so they can make a decision on how to act. Following is a more detailed discussion of some problems that currently exist in the art.

One such problem is that manually detecting events of interest in a dataset is impractical, especially among a sufficiently large amount of data. Particularly, humans can be clumsy and lazy. It is impractical to think that a human could catch all of the minute changes that might be happening in a dataset, and then be able to further the knowledge of those events to produce useful insights into the overall behavior of the data. Especially with larger amounts of data, this is a use case where automation by a non-human entity is required.

However, it is difficult to automate the detection of events of interest that LU have occurred within a dataset. For example, automating the detection of interesting events within data is challenging because data is often stored in multiple locations, what constitutes data of interest must be defined, or learned, and there should to be a storage system for the information which is learned. Thus, multiple different considerations may inform the implementation of automation, and there is presently no effective approach to both take those into account, and then create and implement an automation process.

Another problem known to exist in the art is that monitoring file system events alone, or using traditional file change or access audit trails, is insufficient to capture all events of interest, rather a record of past events is necessary. In fact, only so much can be learned by looking at the present state of data. One needs to also be able to see a long history of the changes which have taken place within and among the data to really be able to predict trends and generate insights.

A final example of known problems is that the current time to discovery for business-relevant information pertaining to change in data or datasets is too long and puts organizations at risk should a change to the dataset introduce a security or access threat. Further, it takes time for users to manually scan through huge amounts of information to detect events which are critical or interesting. This time lag allows problems to exist and grow unchecked, potentially causing issues with security or system performance.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
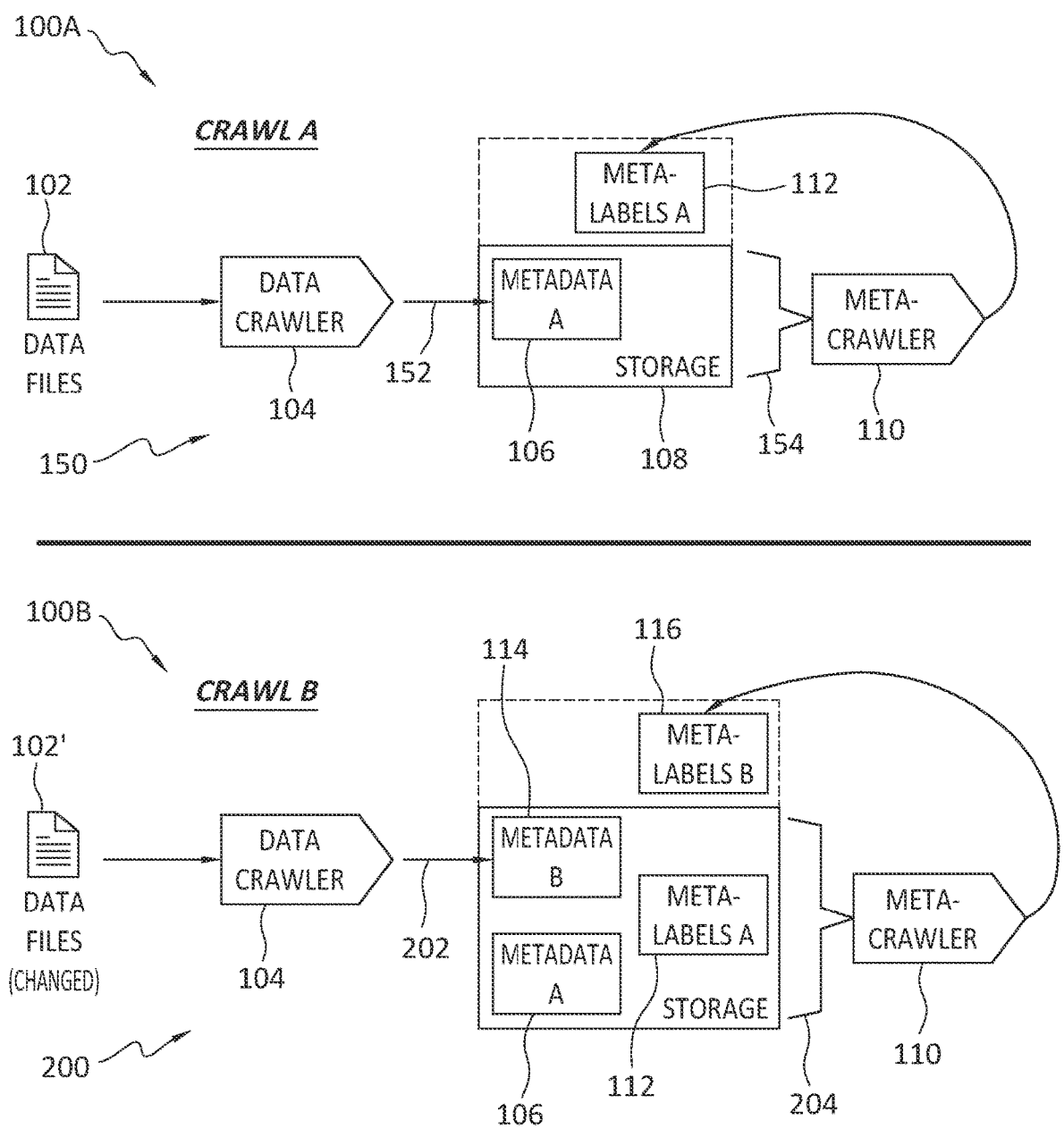
FIG. 1 discloses aspects of an example system configuration and associated processes for crawling data and creating metadata and meta labels.

Embodiments of the present invention generally relate to detection of anomalies in a dataset. More particularly, at least some embodiments of the invention relate to systems, hardware, software, computer-readable media, and methods for crawling data and metadata and then analyzing the metadata to identify anomalies.

Engineers, data scientists, DevSecOps IT admins and system admins deal with cumbersome amounts of data. Even if data is initially well-understood, data is not stagnant. IT admins need to know when events of interest take place within that data. Events of interest may include the addition of sensitive user information to a dataset which did not previously include it, a larger than normal data change on a critical storage system, or a modification to data in an unexpected location. Additionally, events of interest can include other business-relevant behaviors, the knowledge of which can help boost efficiency and drive progress.

Unfortunately, the collection of this data is often done in a manual or ad-hoc style which wastes time and produces spotty results. This also results in no audit trails or record of past events in the data, making it impossible to gain a full understanding of the current state of the data.

In light of various considerations, including those just noted, example embodiments may embrace, among other things, a method for detecting anomalies, or events of interest, in a dataset by analyzing past and present metadata about data and datasets which is produced through a scheduled system of crawls through the data and/or metadata.

Example implementations of a system take into account previously known information about the data via a system of labels created by past crawls, and may combine that with new labels and additional metadata to create informed complex metalabels. The system may also use this information to automatically inform parties in near-real time of critical changes or events, and/or to shorten the time-to-discovery of business critical insights.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of LU this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may account both for current and past states of the data in a dataset in identifying anomalies for possible action. An embodiment may consider both data and metadata as a basis for identifying anomalies in a dataset. An embodiment of the invention may implement a recursive approach, which may be ongoing, that builds on prior crawls through data and/or metadata of a dataset to provide for delivery of insights concerning the dataset to a user. An embodiment of the invention may automatically broadcast insights, concerning a dataset, to interested parties so as to reduce the time-to-discovery of business intelligence, and to enable those parties to make decisions.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which large datasets and associated metadata are evaluated on an ongoing basis. Not only are the datasets large, but they may be in a near-constant state of change. It is not possible for a human to evaluate such datasets, in the disclosed manner, in a timely or effective way. Accordingly, nothing LU herein should be construed as teaching or suggesting that any aspect of any embodiment of the invention could or would be performed, practically or otherwise, in the mind of a human.

A. Overview

At one level, embodiments of the invention are concerned with data analysis. In that regard, it is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Further, embodiments of the invention may be applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

In general, at least some example embodiments aim resolve various problems, examples of which are disclosed herein. In some embodiments, a system is defined and implemented which crawls through storage systems where data resides, and uses newly discovered metadata along with known information from past crawls to create complex meta-labels which describe the state of the data and events which have LU taken place surrounding it.

Embodiments of such a system and associated methods may derive their effectiveness and usefulness at least in part from the fact that they do not only consider the current state of the data to make perform analyses, and make recommendations and decisions. Example embodiments of a system and associated methods may also take into account one or more previous states of the data, as well as previously calculated metalabels which may describe past events concerning or involving the data. In this way, some embodiments of the invention may implement a recursive process which continuously builds on the knowledge that was gained in previous iterations to deliver complex insights straight to the user. This this information may also be automatically broadcasted to interested parties acts to reduce the time-to-discovery of this business critical intelligence.

B. Aspects of Some Example Embodiments of the Invention

With reference now to FIG. 1, details are provided concerning aspects of some example embodiments of the invention, including, data crawling, metadata creation, and metadata crawling. In general, FIG. 1 discloses initial and secondary crawls, showing how an example system takes into account past and present information to create metalabels.

B.1 Crawling and Metadata Creation

The example configuration 100A of FIG. 1 may involve a dataset 102 that may comprise, for example, a set of data files. In general, the dataset 102 may be operated on by a data crawler 104, that is, 'Crawl A,' and an output of the operation of the data crawler 104 on the dataset 102 may take the form of metadata 106 of the dataset 102. The metadata 106 may be retrievably stored by the data crawler 104 in a storage element 108. At some point after the metadata 106 has been created and/or obtained by the data crawler 104, such as after the metadata 106 has been stored for example, a meta crawler 110 may operate on the metadata 106 to create metalabels 112. The metalabels 112 may also be stored in the storage 108, possibly in association with the metadata 106 that was the basis for creation of the metalabels 112, although such association is not required.

With continued reference to FIG. 1, an example process 150 may include a first stage, or crawl, 152 comprising the obtaining and/or creation of metadata, by the data crawler 104, to describe the contents of part or all of the data within the dataset 102. This may be done via a system and series of crawls, which may be performed by the data crawler 104, which may parse through the files and/or other data of a dataset 102 within a storage location on a scheduled, or reactive, basis, for example. In the reactive scenario, the data crawler 104 may parse through the dataset 102 automatically in response to a change to the dataset, such as when a file, directory, object, or other data, in the dataset is added/ changed/removed. The change to the dataset may be detected by the data crawler 104 and/or by another entity.

The output of the crawl 152 performed by the data crawler 104 may comprise various information such as, but not limited to, metadata describing any aspect of a file, record, or other type or collection of data, such as file identifiers, data length, file size and file type, file content, file creation and modification time, discovered LU or calculated meta labels, and file owner information, among other attributes. Information obtained by the crawl 152 may also comprise linked data regarding the storage system where the record was found, the particular crawl which produced the metadata, the time and date the crawl was performed, the location where the metadata was sent for storage, and the identity of the user who requested that the crawl be initiated.

Whatever metadata is captured by a crawler, some embodiments may use a crawler and associated crawl process, or simply 'crawl,' to obtain certain metadata of the records that the crawl pertains to. As noted above, a variety of metadata may be collected in one or more crawls. In some embodiments, particular metadata may be of interest, such as: file location; data length; time/date that a file was created/last modified; the time/data that the file was crawled/ parsed; labels describing key aspects of the content of the record such as a description of the content, and existence of sensitive/interesting data in the record; information about the storage system where the record was found; and, information about users who have accessed, and/or are accessing, the record. While it is not required in any particular embodiment that any, or all, of such metadata be obtained and included in the metadata 106 output, it may be the case that the more information that is captured in the metadata and associated labels, the better the insights are that may be produced in subsequent operations, as described below.

Additionally, each time records or other collections of data are parsed and metadata is produced, such as at 152, a timeline, or data lineage record, may be created, LU such as by the data crawler 104 for example, by linking the previously obtained metadata pertaining to a record to the new metadata pertaining to the same record. The ultimate output of the data crawl 152 may be described as a web of metadata that captures the state of the data at any given time, and overtime. The links in this metadata may be traversed to obtain further information, as described in more detail below.

B.2 Meta Label Creation

With continued reference to the example of FIG. 1, as the crawling 152 by the data crawler 104 takes place, new metadata may be created and/or obtained by the data crawler 104 which describes the current state of the records, that is, the state of the records at the time the crawl 152 is performed, which were parsed. Each time new metadata is created by the crawler 104, a separate process 154, performed by the meta crawler 110, may be crawling that metadata, traversing the links between records to discover interesting and potentially critical events which may have taken place in the data. The meta crawler 110 may crawl 154 the metadata 106 immediately as the metadata 106 is created or obtained by the data crawler 104, or at some time after the metadata 106 is created or obtained by the data crawler 104.

In some embodiments, a crawl 154 performed by the meta crawler 110 may be triggered by initiation or completion of the crawl 152 performed by the data crawler 104. In other embodiments, the meta crawler 110 may detect performance of the crawl 152 and/or a change to the dataset, and may perform the crawl 154 based on detection of one or both of those.

Because of the information which is stored in the metadata for each record LU or other collection of data, this meta crawler 110 may be able to calculate, or otherwise determine, among other things: how much data has been added to, or removed from, a record; whether the nature of the content within a record has changed, and the type of the change that has occurred; if sensitive data has been added to, or removed from, a record; and, any other information pertaining to a record or other collection of data. Note that the foregoing are only illustrative examples of calculations or determinations that may be made by a meta crawler 110, by examining two, or more, directly linked pieces of metadata parsed from the same record, much more may be inferred by performing one or more successive meta-crawls. This may be possible because as the system continues to crawl data and metadata, more and more information will be available on which to perform calculations, make predictions, identify events and problems, and perform other operations pertaining to the crawled data and/or metadata.

As one or more meta crawls 154 take place, and data change events in the dataset 102 are detected by, or otherwise identified to, the meta crawler 110, the fact of the existence and occurrence of the data change events may be stored by the meta crawler 110 in the form of labels, referred to in this document as meta-labels. These meta-labels 112 may be stored by the meta-crawler 110 alongside the metadata 106 created by the data crawler 104, and may be attached to the metadata of records, storage locations, and users, for example. The meta-labels 112 may mark certain events according to, for example, the nature, time, and/or scope, of the event. Examples of such labels may include, but are not limited to, "Large Data Change," or "Personally LU Identifiable Information (PII) Added to File," as having taken place in relation to a collection of data such as a file or record, and/or in relation to an entity such as the owner or creator of a file.

Then, in the process 200 of FIG. 1, when the data crawler 104 crawls again 202 over a set of data, 'Crawl B' in the example of FIG. 1, and produces more metadata 114, the meta crawler 100 may look at the newly created and/or obtained metadata 114, the existing metadata 106 and the meta-labels 112 to create 204 new meta-labels 116 to describe the state of the dataset 102', which reflects changes to the data set 102, and its events even more accurately. This process of data crawling and meta crawling may continue recursively, each time creating more and more metadata and meta-labels which may be taken into account to detect data events, make predictions and create insights.

When enough meta-labels exist, as may be determined by user-specified criteria and/or other criteria for example, the system may use inference and/or other processes to identify, for example, any trends or patterns in data change events. This may be done, for example, by way of a rule based approach, or with the help of machine learning. However, given the amount of metadata which may exist after a number of crawls have been performed, it may not be difficult for a system to begin learning the ins and outs of a storage system and the changes to the data. Particularly, because it may have access to information and metadata about the size of all files, and how those sizes, and data content as well, change over time, the system may be able to calculate that one repository of data is seeing significantly higher amounts of data change than most others. Because the system may have access to information indicating the times that data changes happened, the system may see, for example, that the majority of activity on a storage server happens only in a relatively small time window. Further, since the data crawler 104 may have the ability to locate and identify sensitive data such as PII (Personal Identifying Information and PCI (Personal Confidential Information) within files, the system may notice, for example, that the amount of sensitive user information in a location has grown steadily over the past year. Any of these example insights may be obtained by way of the 2-stage recursive process of the metadata/meta-label production that example embodiments implement.

B.3 Alerts and Alerting

As noted herein, embodiments of the invention may be operable to identify changes that have occurred in and to a dataset over time. In some instances, it may be useful to notify, or alert, a user or administrator of various circumstances related to such changes. Accordingly, embodiments of the invention may provide the ability to generate and transmit alerts.

For example, as the system detects change events, and creates and stores the metadata and meta-labels, the system may decide, according to criteria specified by a user and/or a machine learning process for example, that some or all of the data changes that the system has discovered may have implications for the business, such that a human should be made aware of those changes. The decision criteria may be pre-programmed by a human, and/or may be learned over time as the system observes what actions human users take in response to certain data-related information which has LU been provided to them. For example, 'if no action is taken for event A, stop alerting users about event A.' In any event, sending the information back to the relevant users in a timely manner may be important since certain change events may indicate security threats or access threats.

With considerations such as the foregoing in view, example embodiments may use alerts, which may be triggered based on the events detected through the metadata and meta-labels, to notify users of certain events having taken place. These alerts may take the form, for example, of log file entries, emails, webhook notifications, or any other form suitable to convey to a user that an event of interest is in process, or has taken place. The decisions about when and how to alert may be made, for example, based on the perceived severity of the event which is in progress, or has taken place. For example, a user may wish to be notified immediately if the system determines that confidential information is being copied, or has recently been copied. On the other hand, a user may not require immediate notification if, for example, a file is deleted, since a backup copy of the file is known to exist. The nature and timing of alerts may be specified by a human and/or determined by machine learning over a period of time. In example embodiments, some amount of human intervention may be involved, or at least permitted, in setting up these rules defining these alerts. The rules may be set up based, for example, on the priorities of the business, and may be regularly reviewed and updated as the requirements change. Irrelevant or expired rules may be deleted.

As should be apparent from the discussion, one goal with alerts may be to reduce the time-to-discovery of business critical information, and to allow users to act on the insights they receive from the system. Rather than implementing an automated response to issues that may simply reflect the best guess of the system as to how to react and potentially does too much, or too little, to mitigate, embodiments of the invention may, by alerting a user in real time or nearly real time, enable a human to make a conscious decision on how to respond. This approach may reduce downtime, improve efficiency, and may provide the ability to drive progress in making users aware of events and circumstances they may not otherwise have known about.

For example, if the system sees that larger than normal levels of data change activity are happening in a specific location, or within a specific time window, the system may issue an alert that prompts the user to re-allocate resources, such as processing and/or storage, to improve system response times and prevent storage overflow. Similarly, if the system finds that sensitive data is appearing where sensitive data did not previously exist, a user might re-think security and access controls in that sector. Example insights such as these may have the ability to drive progress and materially improve the abilities of a business or user, and can also prevent catastrophic failures of systems, and breaches in security.

C. Further Discussion

As disclosed herein, example embodiments may provide various useful features and functionalities. By way of illustration, some example embodiments may provide for storage of complex metadata based on business rules, file contents, existing metadata, meta-labels, and event timelines, for use in calculating and generating descriptive file labels or tags. Particularly, some example embodiments may store LU metadata describing the state and content of files within a data set, and also the events which take place regarding those files. This metadata may be created by looking at the contents of the files as well as the events which were already detected in the past. The metadata may be linked to create a graph which represents the ever-changing state of the data and the events which have taken place to change that data.

As another example of such functionalities, some embodiments may implement automatic detection of events of interest regarding files using past and present file metadata. Particularly, some embodiments may operate to continuously parse through the contents of files, and new and existing metadata, to detect events in the data which users would find interesting or critical to business progress. The recursive nature of some embodiments of a metadata creation process may allow insights to be gained and built upon by detecting trends and oddities in data over time.

As a final example of functionalities implemented by some example embodiments, alerts may be defined and triggered which may include details of why the alert was triggered based on detection of events of interest regarding files to reduce time-to-discovery of business critical information. Particularly, alerting the invested parties of business critical information may reduce the time-to-discovery of the information to near zero, and may also reduce the time-to-reaction significantly as well. The individuals who are notified may be able to act quickly in response to the alert, and may obtain a better understanding of why the issue was raised at all.

D. Example Use Case

One example use case for some embodiments involves the discovery of a LU security risk. There are many types of events which may be captured by example embodiments of the disclose system. Following is an example work flow for how a potential security risk may be detected, and the interested parties notified.

Initially, a data crawler parses the files on storage system A hourly. Each crawl produces respective metadata about the current state of the files which reside on the storage system A. Additionally, each time new metadata is created, the metadata, and existing meta-labels, are crawled to capture events and create new meta-labels.

During a crawl, the system notes that 2 months ago, 0 files on system A contained PII data, 1 month ago, 10 files in a shared directory contained PII data, and now, hundreds of files spread throughout system A contain PII and PCI data. The system has been programmed to send out notifications when it sees a significant increase in the amount of sensitive information over the course of less than a year. Accordingly, the system sends an email alert to the devSecOps IT admins who own system A telling them what kinds of data have been added, how many files were affected, who is making the changes, and the locations of those files on system A, along with the time frame over which the change events occurred.

The admins know that system A has very little in the way of security restrictions and is accessible to most of the company. The admins also know that the system is not meant to be used for the storage of PII and PCI data. Thus, the admins make the decision to block further changes to the dataset by the group which has been adding the PII and PCI data, the admins also restrict most users to read-only rights, and get in touch with the users who have been making the changes to alert them to their LU mistake. In this example scenario, the timely actions of the admins prevents a severe data leak from taking place, and saves the company from a potential catastrophe. Had the admins not been alerted to the data changes, the issue could have grown unchecked and caused severe financial and public relations issues for the company.

E. Example Methods

Figure 2:
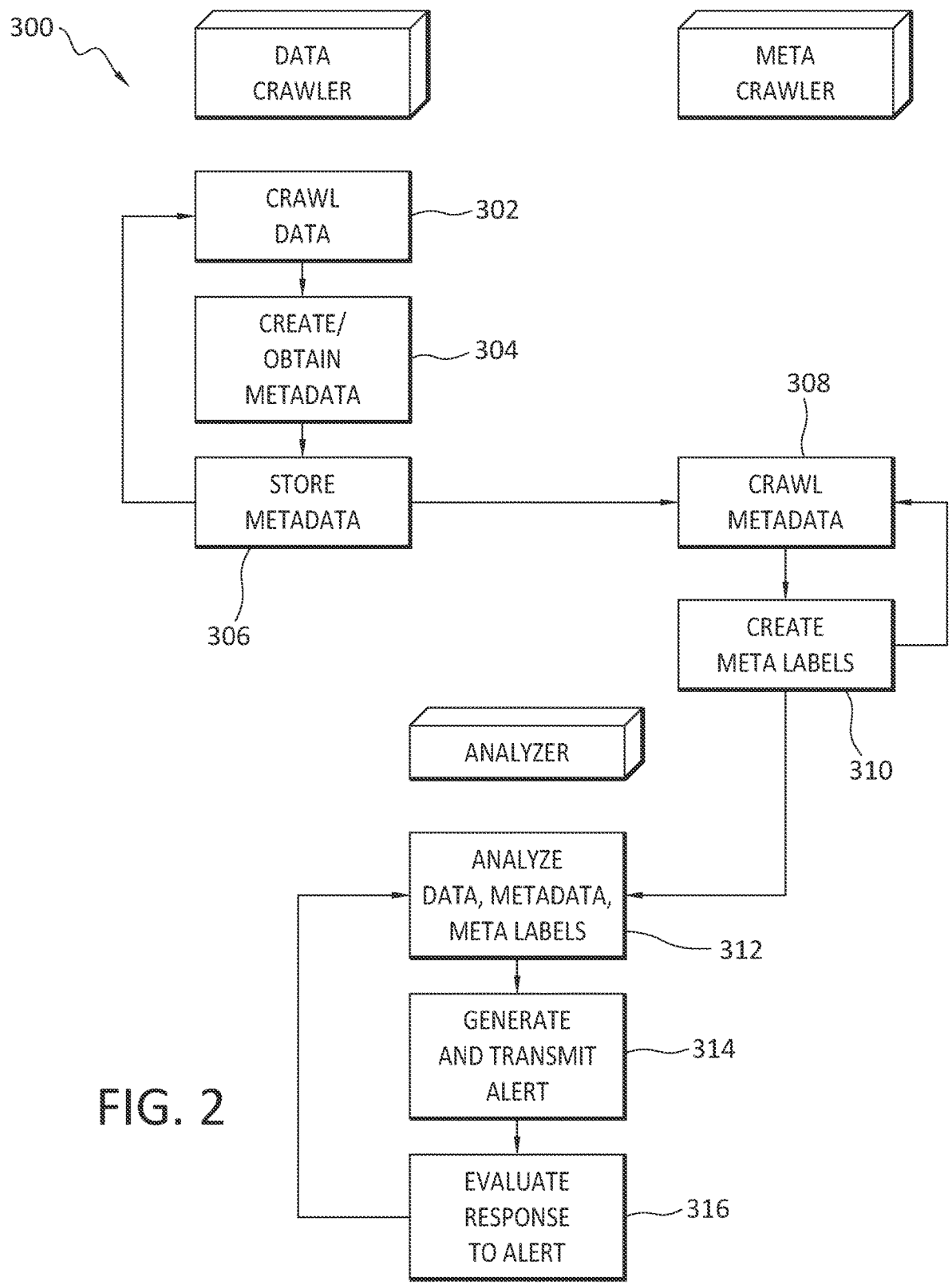
FIG. 2 discloses aspects of some example methods for labeling of data records.

It is noted with respect to the example method of FIGS. 1 and 2 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Figure 3:
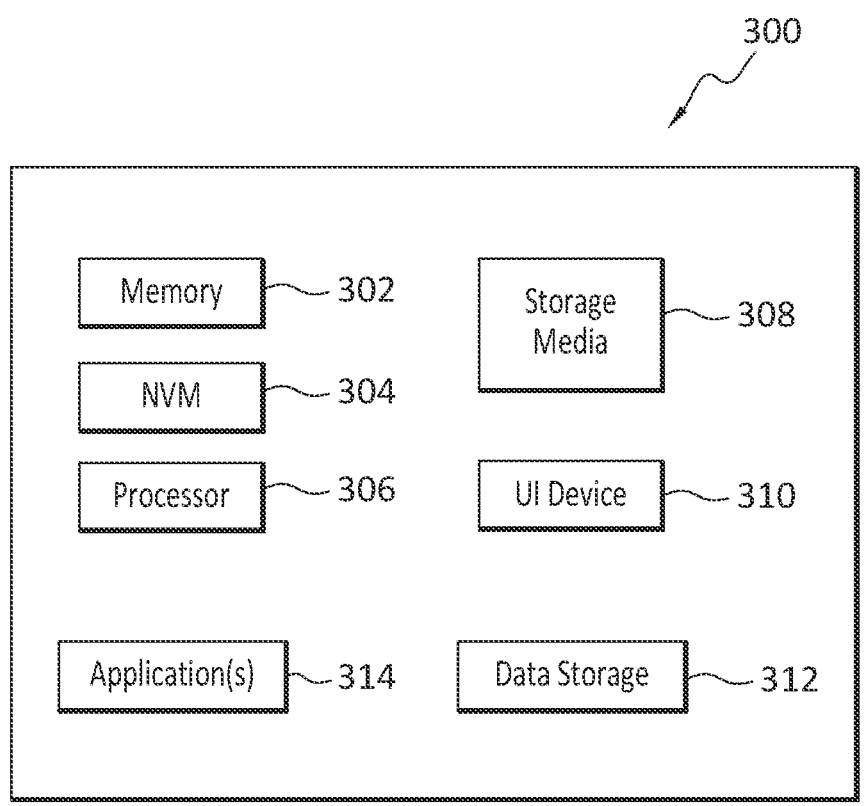
FIG. 3 discloses aspects of an example computing entity operable to perform any of the disclosed methods, processes, and operations.

Directing attention now to FIG. 2, an example method 300 is disclosed. In some embodiments, the method 300 may be performed cooperatively by a group of entities comprising a data crawler, a meta crawler, and an analyzer. However, more or fewer entities may cooperate to perform the method. For example, the meta crawler and data crawler may be combined into a single crawler entity, and/or the analyzer may be incorporated as an element of a meta crawler. More generally, no particular functional allocation is required, and the allocation disclosed in FIG. 3 is provided only by way of example and is not intended to limit the scope of the invention.

The example method 300 may begin when a data crawler crawls 302 a new or modified dataset. The dataset may be any collection of data, and may include, for example, files, records, objects, or any other type of data disclosed herein. As a result of the crawl 302, the data crawler may create and/or obtain metadata 304 concerning the data that was crawled, or examined, by the data crawler. The data crawler may then store 306 the metadata, such as at a storage site. As indicated in FIG. 3, processes 302, 304, and 306, may be performed repeatedly. In some embodiments, the performance of those processes may be triggered by a change of some kind to the data in the dataset. In the same, or other, embodiments, performance of the processes 302, 304, and 206, may be performed on a regular or recurring basis.

At some point during, or after, storage 306 of the metadata, a meta crawler may crawl 308 the metadata that was created/obtained 304 by the data crawler. Based on the meta crawl 308, the meta crawler may generate 310 one or more meta labels. The meta labels may stored alongside the data that was the basis for their creation, and may be attached or otherwise associated to the metadata of records, storage locations, users, or other elements that relate in some way to data in the dataset. The labels may mark or indicate the occurrence of particular events relating to the data in the dataset. As indicated in FIG. 3, processes 308 and 310 may be performed, for example, on an ongoing recurring basis, or an ad hoc basis in response to a triggering event such as a change to the dataset, or in response to detection of the performance of a data crawl by the data crawler, or on all of these bases, for example.

With continued reference to FIG. 2, after the meta labels have been created 310, an analyzer may then analyze 312 the data, metadata, and/or, meta labels to identify any trends and events of possible interest. Based on the outcome of the analysis 312, one ore more alerts may be generated 314 and transmitted to a computing entity and/or to a human, for further action. The computing entity and/or human may respond to the alert by implementing one or more actions based on the alerts received.

Finally, the analyzer may evaluate the response, if any, to the alerts that were transmitted. For example, if there is no response by the human and/or computing entity that received the alert, within a period of 30 days, the analyzer may conclude that the activity upon which generation of the alert was based is not of interest, and may desist from sending such alerts in the future.

Like the other portions of the example method 300, the processes 312, 314, and 316, may be performed on a recursive basis, ad hoc, or on any other suitable basis. In some embodiments, performance of those processes may be triggered by creation and/or storage of meta labels 310. Other triggers, if any, may alternatively be employed.

F. Further Example Embodiments

Following are some further example embodiments of the invention. These are presented only by way of example and are not intended to limit the scope of the invention in any way.

Embodiment 1. A method, comprising: crawling data included in a dataset; based on the crawling of the data, creating and/or obtaining metadata concerning the data; crawling the metadata and obtaining information about a data change event involving the data; based on the crawling of the metadata, creating a meta LU label that documents occurrence of the data change event; and associating the meta label with the metadata.

Embodiment 2. The method as recited in embodiment 1, further comprising analyzing one or more of the data, metadata, and meta label.

Embodiment 3. The method as recited in any of embodiments 1-2, further comprising, based on the analyzing, generating an alert concerning the data change event, and transmitting the alert to an entity for action.

Embodiment 4. The method as recited in embodiment 3, wherein the alert includes information indicating why the alert was generated.

Embodiment 5. The method as recited in any of embodiments 1-4, wherein the meta label indicates a state of the data at the time the data was crawled.

Embodiment 6. The method as recited in any of embodiments 1-5, wherein crawling of the data is triggered by occurrence of an event affecting the data.

Embodiment 7. The method as recited in any of embodiments 1-6, wherein crawling of the metadata is triggered by crawling of the data.

Embodiment 8. The method as recited in any of embodiments 1-7, wherein the data is a part of the contents of a file, and the metadata is created based on the contents and the data change event.

Embodiment 9. The method as recited in any of embodiments 1-8, wherein the data change event is automatically detected based on both the metadata, and metadata concerning an earlier data change event that took place prior to the data change event.

Embodiment 10. The method as recited in any of embodiments 1-9, wherein the method is performed recursively to generate additional metadata, and another meta label created based on the metadata and the additional metadata.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, LU CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are LU disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 3, any one or more of the entities LU disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   crawling, by a data crawler, data included in a dataset;
   based on the crawling of the data, creating and/or obtaining, by the data crawler, metadata concerning the data, the metadata including new metadata created by the data crawler, as well as previously obtained metadata that is associated with the data and that was obtained by a prior crawling of the data;
   creating or modifying, by the data crawler, a data lineage record for the data by linking the previously obtained metadata with the new metadata;
   crawling, by a meta crawler, the metadata and obtaining information about a data change event involving the data, wherein the meta crawler is operable to examine two or more directly linked pieces of metadata parsed from a common record and, based on this, calculate or otherwise determine any one or more of: how much data has been added to, or removed from, the record; whether the nature of the content within the record has changed, and the type of the change that has occurred; and, if sensitive data has been added to, or removed from, the record;
   based on the crawling of the metadata, creating, by the meta crawler, a meta label that documents occurrence of the data change event, wherein the meta label indicates a state of the data at a time the data was crawled; and
   associating the meta label with the metadata.

2. The method as recited in claim 1, further comprising analyzing one or more of the data, metadata, and meta label.

3. The method as recited in claim 2, further comprising, based on the analyzing, generating an alert concerning the data change event, and transmitting the alert to an entity for action.

4. The method as recited in claim 3, wherein the alert includes information indicating why the alert was generated.

5. The method as recited in claim 1, wherein crawling of the data is triggered by occurrence of an event affecting the data.

6. The method as recited in claim 1, wherein crawling of the metadata is triggered by crawling of the data.

7. The method as recited in claim 1, wherein the data is a part of contents of a file, and the metadata is created based on the contents and the data change event.

8. The method as recited in claim 1, wherein the data change event is automatically detected based on both the metadata, and metadata concerning an earlier data change event that took place prior to the data change event.

9. The method as recited in claim 1, wherein the data that is crawled is distributed across multiple different locations.

10. A non-transitory computer readable storage medium having stored therein instructions that are executable by one or more hardware processors to perform operations comprising:
    crawling, by a data crawler, data included in a dataset;
    based on the crawling of the data, creating and/or obtaining, by the data crawler, metadata concerning the data, the metadata including new metadata created by the data crawler, as well as previously obtained metadata that is associated with the data and that was obtained by a prior crawling of the data;
    creating or modifying, by the data crawler, a data lineage record for the data by linking the previously obtained metadata with the new metadata;
    crawling, by a meta crawler, the metadata and obtaining information about a data change event involving the data, wherein the meta crawler is operable to examine two or more directly linked pieces of metadata parsed from a common record and, based on this, calculate or otherwise determine any one or more of: how much data has been added to, or removed from, the record; whether the nature of the content within the record has changed, and the type of the change that has occurred; and, if sensitive data has been added to, or removed from, the record;
    based on the crawling of the metadata, creating, by the meta crawler, a meta label that documents occurrence of the data change event, wherein the meta label indicates a state of the data at a time the data was crawled; and
    associating the meta label with the metadata.

11. The non-transitory computer readable storage medium as recited in claim 10, wherein the operations further comprise analyzing one or more of the data, metadata, and meta label.

12. The non-transitory computer readable storage medium as recited in claim 11, wherein the operations further comprise, based on the analyzing, generating an alert concerning the data change event, and transmitting the alert to an entity for action.

13. The non-transitory computer readable storage medium as recited in claim 12, wherein the alert includes information indicating why the alert was generated.

14. The non-transitory computer readable storage medium as recited in claim 10, wherein crawling of the data is triggered by occurrence of an event affecting the data.

15. The non-transitory computer readable storage medium as recited in claim 10, wherein crawling of the metadata is triggered by crawling of the data.

16. The non-transitory computer readable storage medium as recited in claim 10, wherein the data is a part of contents of a file, and the metadata is created based on the contents and the data change event.

17. The non-transitory computer readable storage medium as recited in claim 10, wherein the data change event is automatically detected based on both the metadata, and metadata concerning an earlier data change event that took place prior to the data change event.

18. The non-transitory computer readable storage medium as recited in claim 10, wherein the data that is crawled is distributed across multiple different locations.

* * * * *